United States Patent [19]
Afflerbach et al.

[11] 3,956,545
[45] May 11, 1976

[54] GLASS FIBER FRICTION ELEMENT

[75] Inventors: Frank D. Afflerbach, Levittown, Pa.; Irvin Barnett, Martinsville; Walter B. Peters, South Orange, both of N.J.

[73] Assignee: Johns-Manville Corporation, Denver, Colo.

[22] Filed: Dec. 23, 1974

[21] Appl. No.: 535,899

Related U.S. Application Data

[62] Division of Ser. No. 252,119, May 10, 1972, Pat. No. 3,870,581.

[52] U.S. Cl. ................................ 428/37; 428/64; 428/222; 156/175; 188/251 R; 192/107 R
[51] Int. Cl.² ..................... B32B 5/12; B32B 5/16; B65H 81/00; F16D 69/00
[58] Field of Search .................. 161/42, 47; 156/192–193, 173, 175; 428/37, 64, 222; 192/107 M; 188/251 A

[56] References Cited
UNITED STATES PATENTS

| | | | |
|---|---|---|---|
| 3,627,606 | 12/1971 | Bentz et al. ............... | 156/192 X |
| 3,713,934 | 1/1973 | Morton ....................... | 156/173 X |
| 3,743,069 | 7/1973 | Barnett et al. ............. | 156/173 X |

*Primary Examiner*—Philip Dier
*Attorney, Agent, or Firm*—Robert M. Krone; Joseph J. Kelly; James W. McClain

[57] ABSTRACT

A friction disc comprises continuous longitudinally coextensive generally parallel glass strands wound spirally in the plane of the disc; short, generally parallel glass strands extending normal to the plane of the disc along said spiral; non-ferrous metal chips or wires; and a heat curable cement binding said glass strands and non-ferrous metal chips or wires together. The friction disc is made by forming a glass fabric with warp rovings of continuous parallel glass strands and fill rovings of continuous parallel glass strands; impregnating the fabric with a heat curable cement; winding the glass fabric onto a mandrel to form a spirally wrapped cylinder; slicing the cylinder into disc preforms; and molding the disc preforms under heat and pressure. Either non-ferrous metal wires are included in the fabric or non-ferrous metal chips are deposited on the fabric prior to wrapping the fabric onto the mandrel.

7 Claims, 5 Drawing Figures

U.S. Patent May 11, 1976 Sheet 1 of 2 3,956,545
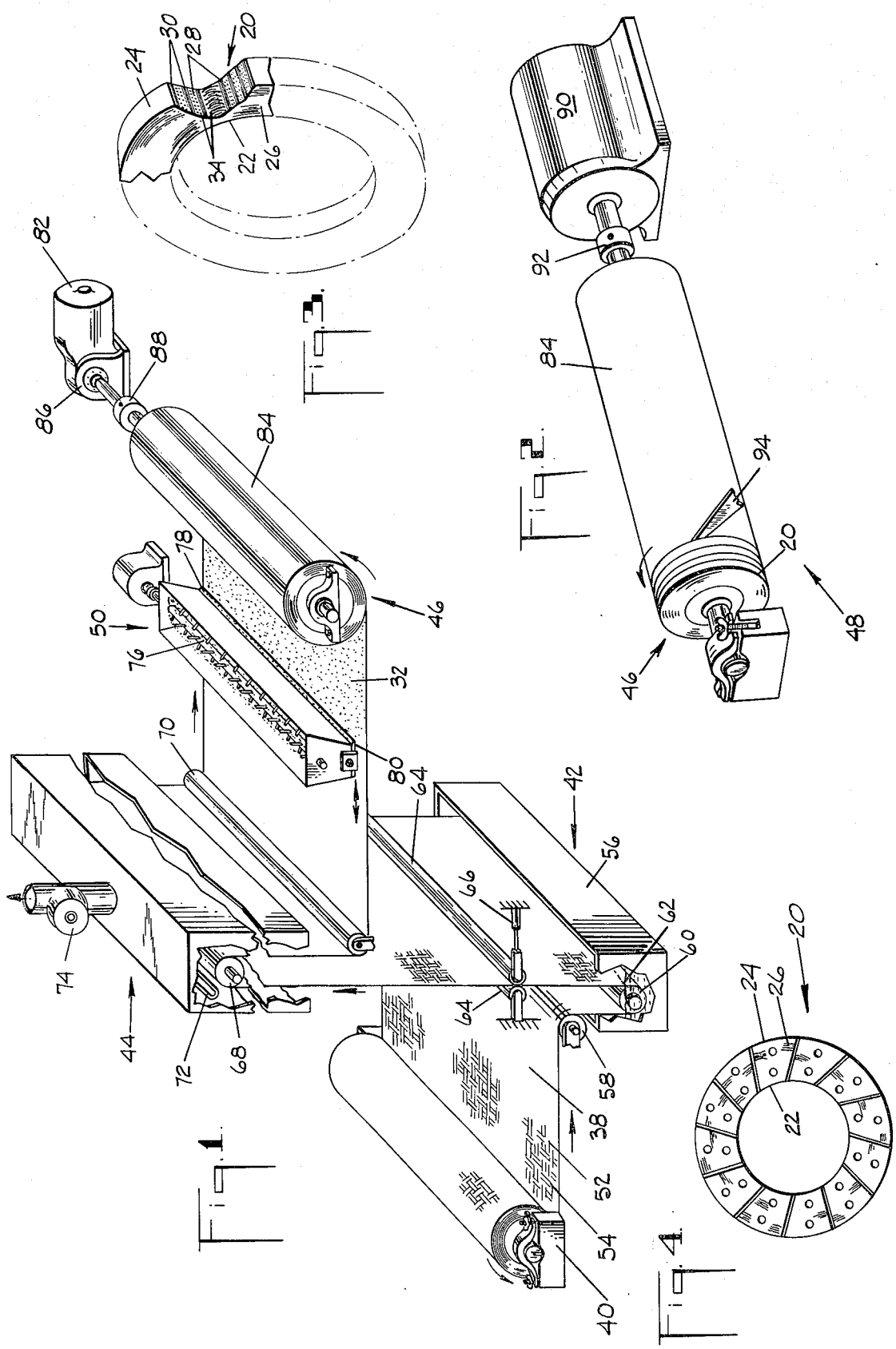

GLASS FIBER FRICTION ELEMENT

This is a division of application Ser. No. 252,119, filed May 10, 1972, now U.S. Pat. No. 3,870,581.

BACKGROUND OF THE INVENTION

The present invention relates to friction elements such as clutch facings and the method of making such elements utilizing woven glass fiber rovings as the reinforcing and friction material.

Conventional clutch facings for automotive service employ asbestos yarn and a non-ferrous wire like copper, brass, or zinc which are twisted together, treated with a friction cement, wound into preforms, molded and finished. As spin strength requirements for clutch facings became more demanding, glass fibers were used to strengthen the facings while retaining asbestos fibers for the friction material. However, it was not until the inventions disclosed in application Ser. No. 156,267 filed June 24, 1971, now U.S. Pat. No. 3,756,910 and Ser. No. 156,410 filed June 24, 1971, now U.S. Pat. No. 3,743,069 that glass fibers were used with non-ferrous metal and cement to provide a friction element with glass fibers as both the reinforcing and friction material.

It is an object of the present invention to provide an improved friction element which has excellent spin strength and frictional properties. It is a further object of the present invention to provide a method of producing such a friction element from woven glass fiber rovings which is faster and more economical than previous methods employed.

The improved friction element is achieved by providing a disc having continuous, untwisted parallel strands of glass fiber extending in a circumferential direction in the disc to provide the required spin strength. The friction element also has strands of glass fiber extending in a direction that is generally normal to the face of the disc to provide excellent frictional properties. The disc is either provided with non-ferrous metal chips which are dispersed throughout the disc or non-ferrous metal wires which are included in the circumferentially and/or normally extending strands of the disc.

The improved method of forming the friction element comprises forming a glass fabric of continuous parallel glass warp strands and continuous parallel glass fill strands; passing the fabric through a bath of heat curable cement to impregnate the fabric; winding the fabric onto a mandrel to form a spirally wrapped cylinder; slicing the cylinder into disc preforms; and molding said disc preforms under heat and pressure. Non-ferrous metal is incorporated into the friction element by either depositing non-ferrous metal chips on the fabric prior to wrapping the fabric on the mandrel or including non-ferrous metal wires in the warp and/or fill strands.

BRIEF DESCRIPTION OF THE DRAWINGS

FIG. 1 is a schematic representation of apparatus for carrying out the method of the present invention;

FIG. 2 is a perspective view illustrating an apparatus for slicing the cylinder into disc preforms;

FIG. 3 is a diagramatic perspective of a friction element preform of the present invention such as a clutch facing preform, with portions broken away to illustrate the orientation of glass strands within the preform; and FIG. 3a is an enlarged view of that portion of the clutch facing shown in FIG. 3 as a broken away section.

FIG. 4 is a face view of a friction element of the present invention;

DETAILED DESCRIPTION OF THE INVENTION

Figure 9A:
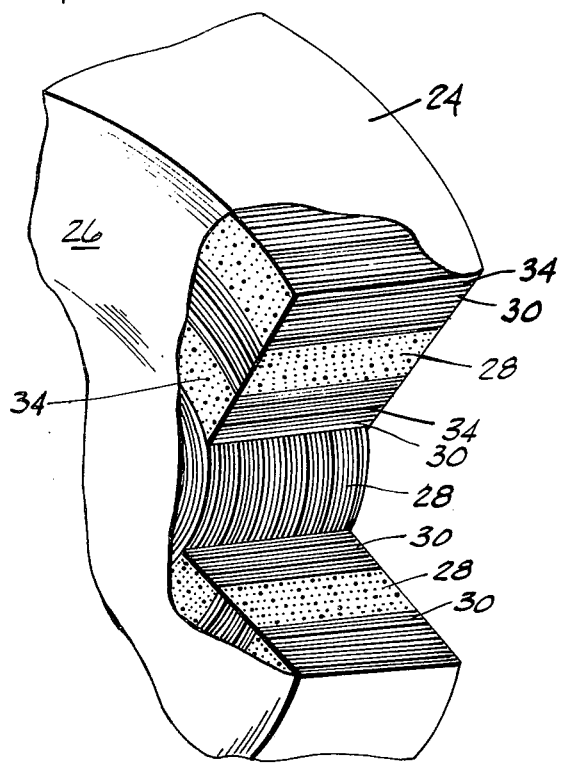

FIG. 4 illustrates a friction element 20, e.g., a clutch facing, of the present invention made in accordance with the method of the present invention. The friction element 20 is a disc with an inner annular edge 22, a peripheral annular edge 24 and substantially flat annular friction surfaces 26 extending intermediate edges 22 and 24. The friction element 20 is made up of long continuous spirally wound glass strands 28 which lie in planes generally parallel to the surface 26 of the disc and short glass strands 30, located throughout the disc, which extend between and are normal to surfaces 26. The orientation of the strands within the disc is best shown in FIG. 3a which represents the friction element preform prior to the molding operation.

In one embodiment non-ferrous metal chips 32 such as brass, copper, or zinc chips are uniformily interspersed with the glass fiber strands 28 and 30 with a friction cement binding the glass strands and non-ferrous metal chips together. In another embodiment, non-ferrous fine metal wires 34 such as brass, copper or zinc wires are included with the short strands 30 and extend intermediate faces 26 of the clutch facing in a direction substantially normal to the surfaces 26. As with the other embodiment, friction cement holds the glass strands and non-ferrous wire elements together.

It is also contemplated that fine metal wires 34 can be included with the spirally wound glass strands 28 either in conjunction with wires included with the short strands 30 or as an alternative to the placement of wires with the short strands. However, the purpose of the wires 34 or chips 32 is to provide a source of non-ferrous metal which is dispersed over the surface 26 of the disc during operation to prevent or minimize chatter. The non-ferrous metal is also thought to act as an inorganic friction material which is stable at high temperatures and as a means to help dissipate heat during use of the disc. With the wires included in the spirally wound glass strands 28, the amount of wire exposure might vary greatly during different phases of disc wear thereby providing a nonuniform supply of non-ferrous metal for dispersion over the surface 26. Thus it is preferred to include the wires with the short strands 30 where their ends will always be exposed to provide a more uniform source of non-ferrous metal for surfaces 26 and consequently a disc with relatively constant performance characteristics throughout its use.

While various heat curable cements can be used for the binder, a preferred binder is a rubber phenolic friction cement. A typical rubber phenolic friction cement, in approximate percentages by weight totaling 100% comprises: GRS Polymer 30%; Curing Agents 30%; Fillers 20%; and Resin 20%.

FIGS. 1 and 2 illustrate apparatus for carrying out the method of the present invention. A fabric 38 of woven glass fiber rovings is unwound from a supply roll mounted on a mandrel 40, impregnated in a bath 42, dried in a drying tower 44, wrapped on a mandrel 46, sliced into discs by slicing apparatus 48 and molded into the final product. When non-ferrous metal chips 32 are included in the friction element, the chips are deposited on the fabric 38 by a distributing apparatus or hopper 50.

The fabric 38 of woven glass fiber rovings comprises warp rovings 52 and fill rovings 54. The rovings each contain 10 to 120 ECK glass strands. Each strand is made up of 200 to 800 individual continuous ECK glass filaments which each have a diameter in the range of about 12 to 14 microns. Each warp roving 52 is continuous with the individual strands 28 making up each warp roving being continuous from one end of the roving to the other end of the roving. Likewise, each fill roving 54 is continuous with the individual strands 30 making up each fill roving being continuous from one end of the roving to the other end of the roving. The strands in each of the rovings are substantially parallel with respect to each other with little or preferably no twist being present.

When non-ferrous metal chips 32 are not going to be included in the friction element 20 the fine metal wires 34 are included in the warp and/or fill rovings. The fine metal wires 34 are in parallel alignment with the glass strands of the respective roving and are continuous from one end of the roving to the other.

According to the method of the present invention a roll of fabric 38 which is to be treated according to the process of the present invention is first mounted on a mandrel 40. The mandrel is rotatably mounted in bearings and is free to rotate about its longitudinal axis as the fabric 38 is drawn off the supply roll. The impregnating bath 42 is provided to thoroughly impregnate the fabric with a heat curable cement such as a rubber phenolic friction cement. The bath 42 comprises a reservoir 56 and a pair of idler rolls 58 and 60 which direct the fabric down into and through a pool 62 of the friction cement. The idler roll 60 is mounted beneath the surface of the cement pool 62 to thereby assure that the fabric 38 is immersed in the pool for a sufficient length of time to be thoroughly impregnated with the cement.

The squeeze rolls 64 are mounted on parallel axes with the fabric 38 passing intermediate the rolls. Means such as hydraulic cylinders 66 are provided to adjust the spacing between the rolls so as to vary the pressure exerted on the fabric by the rolls. This enables the rolls to be correctly adjusted to control the amount of cement impregnation. While squeeze rolls 64 are shown, it is also contemplated that other means could be utilized to remove excess cement from the fabric such as a pair of roll and knife assemblies.

The drying tower 44 is generally about 25 feet in height. The tower includes a pair of idler rolls 68 and 70 rotatably mounted so as to guide the fabric through the tower. The tower is electrically heated by heating units 72 or steam heated to the desired temperature for effecting the removal of volatiles from the cement and is provided with an exhaust fan 74 to remove the volatile vapors from the tower. The length of travel of the fabric through the tower; the rate at which the fabric is drawn through the tower; and the temperatures within the drying tower are regulated so that the volatiles will be removed from the cement without causing the cement to set prematurely.

The hopper 50 is provided to distribute the non-ferrous metal chips 32 over the surface of the coated fabric prior to wrapping the fabric on the mandrel 46. While many different types of apparatus can be employed to evenly distribute the non-ferrous metal chips over the material, hopper 50 is provided with a screw or auger 76 which extends the length of the hopper and feeds the non-ferrous metal chips 32 through a longitudinally extending slot 78 in the bottom of the hopper. The bottom plate 80 of the hopper 50 is slidably mounted on the hopper so that the width of the slot can be adjusted. The amount of non-ferrous metal chips distributed onto the fabric can be regulated by adjusting the rotational speed of the auger and/or the opening of the discharge slot 78 in the bottom of the hopper.

The mandrel 46 is driven by a motor 82 or other conventional means to draw the material from the supply roll through the impregnating bath 42, the squeeze rolls 64, the drying tower 44 and onto the mandrel. The fabric is spirally wrapped on the mandrel to form a hollow cylinder 84 of the coated fabric 38. Due to the relatively slow speed at which the fabric 38 is wound on the mandrel 46, the motor 82 is coupled to the mandrel through a speed reducer 86. A coupling 88 connecting the speed reducer to the mandrel is a conventional releasable coupling to allow the mandrel to be removed once the winding is completed. If the fabric is subjected to excess stresses or tension some of the idlers illustrated in the apparatus can be replaced by powered rolls to facilitate the feed of the fabric from the supply roll to the mandrel 46. However, a certain amount of tension must be maintained on the fabric 38 as it is being wrapped onto mandrel 46 to assure that the fabric is tightly wound about this mandrel. Preferably the mandrel 46 has an outside diameter which is substantially equal to the desired inside diameter of the preform. In this way the final machining of the product after molding is minimized.

The mandrel is adapted to fit on a slicing apparatus 48 as shown in FIG. 2. There the mandrel is rotated by the motor 90 which is connected to the mandrel by a releasable coupling 92. While the mandrel is rotated, a knife 94, or other similar means slices the cylinder into discs of the desired thickness. A conventional assembly, not shown, is provided to feed the knife 94 toward the mandrel to effect a cut, retract the knife when a cut has been completed and then index the knife 94 longitudinally with respect to the mandrel for the next cut.

After the slicing is completed, the disc like preforms, illustrated in FIG. 3, are removed from the mandrel. Due to the friction between adjacent and overlapping layers of strands resulting from the winding operation plus the inherent tackiness of the uncured cement composition, the disc preform 20 maintains its disc-like form. The uncured preform is then placed between flat platens under pressure in the range of 2,000 to 2,500 psi and cured at a temperature of from 320°F to 340°F for 4 minutes. This initial cure hardens resins to a non-flow condition. Thereafter the partially cured and densified preforms are removed and subjected to a post bake for completing the polymerization of the resins. The post bake comprises further curing under reduced pressure for about 6 hours at 360°F and 2 hours at 400°F. Upon completion of this post cure, the discs are ready to have flashing removed and be ground to the proper thickness. The finished facings in FIG. 4 are provided with rivet holes having counter bores for reception of attaching rivets for securing the facings to a clutch plate or brake mounting not shown.

What we claim is:

1. A friction element consisting essentially of an annular disc of glass strands bonded together with a cement, said disc having an inner annular edge, an outer annular edge, and generally flat surfaces extending intermediate said edges, said disc having one portion of said glass strands extending spirally from said inner edge to said outer edge and the other portion of said strands extending normal to said flat surfaces and dispersed throughout said disc.

2. The friction element as defined in claim 1 wherein a non-ferrous metal is interspersed with said glass strands.

3. The friction element as defined in claim 2 wherein said non-ferrous metal is selected from a group consisting of brass, copper or zinc.

4. The friction element as defined in claim 2 wherein said non-ferrous metal is in the form of chips interspersed with said glass strands.

5. The friction element as defined in claim 2 wherein the non-ferrous metal is in the form of strands interspersed with said glass strands extending normal to said flat annular surfaces.

6. The friction element as defined in claim 1 wherein said cement is a rubber phenolic friction cement.

7. The friction element as defined in claim 1 wherein said glass strands are continuous.

* * * * *